2 UC fertile material
4 PuC fuel

6 PLUTONIUM CARBIDE OR URANIUM-PLUTONIUM CARBIDE

8 PLUTONIUM NITRIDE OR URANIUM-PLUTONIUM NITRIDE a

United States Patent Office 3,813,344
Patented May 28, 1974

3,813,344
NUCLEAR FUEL TABLET CONTAINING URANIUM CARBIDE, PLUTONIUM CARBIDE AND PLUTONIUM NITRIDE, SULFIDE OR PHOSPHIDE
Axel Krauth, Wurzburg, and Norbert Muller, Wolfgang, near Hanau, Germany, assignors to NUKEM, G.m.b.H., Wolfgang, near Hanau, Germany
Filed Sept. 29, 1971, Ser. No. 184,818
Int. Cl. C09k *3/00;* G21c *19/42*
U.S. Cl. 252—301.1 R          5 Claims

ABSTRACT OF THE DISCLOSURE

Nuclear fuels are prepared from uranium-plutonium-carbide or uranium-plutonium-nitride in which the fertile material (e.g. uranium carbide) and the fuel (plutonium carbide) are present arranged separately and the fuel (e.g. plutonium carbide) region has a higher and more open porosity than the fertile material (e.g. uranium carbide).

---

Figure 1:
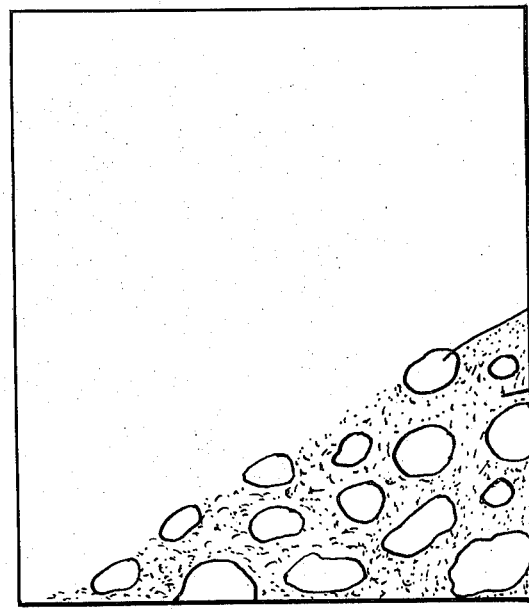

As is known in most nuclear reactors fuel oxides (e.g. uranium oxide) are employed. In spite of good corrosion stability and resistance to high temperature (melting point 2850° C.), this fuel is no longer well suited for certain reactor concepts. This is true especially in all cases in which a high power density is required in the fuel rod, as, for example, in the "rapid breeders" or in "rapid high flux test reactors." In these cases the poor heat conductivity of the uranium oxide makes it noticeably undesirable. In experiments for finding suitable fuels the fuel monocarbide or fuel mononitride appeared especially suitable because of their high heat conductivity and their relatively high melting points of 2400° C., respectively 2800° C. The high corrosion susceptibility, for example to water, however, excludes the carbide as fuel in water or steam cooling. Moreover, because of these properties the production of carbide fuels is made difficult and expensive, since one must work in the box systems largely with extremely pure atmospheres. Since in the sodium cooled quick breeders the pure uranium carbide or uranium nitride are not of primary interest, but instead a mixed carbide or mixed nitride of uranium and plutonium is of such interest the plutonium because of its dangerous radiation and poisonous nature must be handled under special safety precautions and the consequent cost of the fuel is increased again by these additional precautions.

For these reasons the fuel monocarbide or fuel mononitride until now have not found widespread use although they have been known for many years and have been produced in amounts of many tons for special purposes.

The present invention makes it possible to carry out the development of the various process steps such as carbide synthesis or nitride synthesis and powder production without requiring the plutonium conditions causing an increase in expense of the product.

In the fuel variants of the invention the plutonium nitride are not present in the fuel in a homogeneously distributed state; the fertile material (uranium carbide or uranium nitride) and the fuel (plutonium carbide or plutonium nitride) rather exist separately and compared with the fertile material (uranium carbide or uranium nitride) the fuel material (plutonium carbide or plutonium nitride) has a higher and open (i.e. more open) porosity. The fuel (plutonium carbide or plutonium nitride) is present between regions consisting of almost pure uranium carbide or uranium nitride (the fertile material). The porosity of the fuel is generally 1.2 to 2 times the porosity of the fertile material. In this arrangement of the plutonium carbide or plutonium nitride the fission gas can come through open pores in the fission gas space without swelling of the fuel tablets occurring. Such a fuel is of interest, for example, for the so-called vented fuel arrangement in which the fission gas is not retained in the fuel but through suitable devices is removed from the fuel rod.

The weight of the fuel material is 15 to 20% of the weight of the fertile material.

Figure 2:
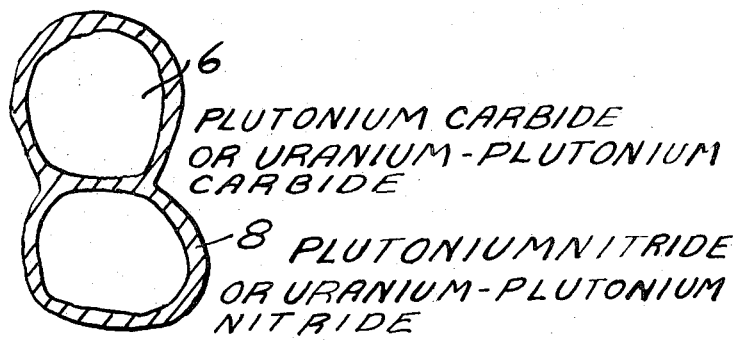

In the drawings:
FIG. 1 illustrates the structure of a fuel tablet made of uranium carbide (or uranium nitride).
FIG. 2 shows the structure of a plutonium carbide nucleus treated according to one form of the invention.

As shown in FIG. 1 there are regions of uranium carbide particles 2 and plutonium carbide particles 4.

Because of the high susceptibility to corrosion, especially of plutonium carbide, it is very difficult to fill the carbide fuel into encasing tubes and thereby to keep down the content of adsorbed gases and oxygen on the surface of the fuel. This is true, especially then, if—as in the rapid breeders—only if a relatively limited fuel density between 80 and 90% of the theoretical maximum density is permissible and whereby a fuel of higher specific surface area is present in the form of porous sintered particles. Well known are experiments for the production of a uranium carbide nitride or plutonium carbide nitride which is stabile against corrosion attack, for example, by adding of nitrogen. These also are extensively successful at nitrogen-carbon ratios of about 1 to 4 or higher. However, this amount of nitrogen is neutron physically possibly too high for the reactor concepts in question.

The present invention further makes it possible to maintain even at such small amounts of additives the stabilizing influence of foreign additives, as for example nitrogen, that they are still tolerable neutron physically. This is attained by placing the foreign additives as a type of jacket around the plutonium carbide particles and thereby screening the carbide from the outside.

As additives first of all nitrogen, sulfur or phosphorus can be used. These materials form solid mixed crystals with the monocarbide as fuel nitride, sulfide or phosphide whereby it is additionally possible to produce a single phase nuclear fuel in the form of a modified monocarbide which promises especially favorable reactor behavior. The function of this encasing layer, for example of fuel nitride is that it does not prevent the escape of fission gas as is known to be the case with the "coated particles." The encased fuel of the invention rather has the advantage that at very small nitrogen, sulfur or phosphous content there is attained not only a stabilizing action against the water and oxygen content of the atmosphere but also the single phasability of the fuel. The content of the additive element can be less than 1 weight percent and is usually 0.4 to 0.6% based on the plutonium carbide (or nitride) content, the thickness of the protective layer amount to between 2 and 20 μm. FIG. 2 shows this type of treated plutonium carbide nucleus wherein the plutonium carbide (or uranium-plutonium-carbide) particles 6 are encased in a layer 8 of plutonium nitride (or uranium-plutonium-nitride).

Unless otherwise indicated all parts and percentages are by weight.

EXAMPLE 1

Uranium carbide powder having a surface area of 1.0 to 2.0 m.²/g. was agglomerated to secondary particles having diameters between 100 and 1000 μm. 100 parts by weight of these agglomerates were homogenized in a mixer with 20 parts by weight of particles of plutonium oxide with a surface area of 4.0 m.²/g. and 14.4 parts by weight of carbon.

The fuel tablets without lubricants were compressed at pressures between 1 and 5 metric tons/cm.² to green briquettes having density between 50 and 80% of the theoretical density. Sintering was accomplished at temperature between 1600° C. and 1700° C. for 3 hours in a vacuum. (Alternatively an argon or other inert gas atmosphere can be employed. The sintered densities obtained were between 75 and 85% of the theoretical density. The fuel and fertile regions were present separately in the sintered product wherein the fertile regions were relatively denser than the fuel regions.

EXAMPLE 2

Uranium carbide powder with a surface area of 1.0 to 2.0 m.$^2$/g. were agglomerated to secondary particles having diameters between 100 and 1000 μm. These agglomerates were homogenized in a mixer with 20 parts by weight of the product obtained by pre-reacting a mixture of plutonium oxide and carbon (14.5 weight percent carbon) at 1300° C. to 1400° C. and subsequently grinding to a surface area between 0.5 and 1.0 m.$^2$/g. (about ½ the surface area of the uranium carbide on the average) with a particle diameter of ∼1 μm. The tablets were compressed at pressures between 1 and 5 metric tons/cm.$^2$ to green briquettes with densities between 50 and 80% of the theoretical density. The sintering took place for 4 hours at temperatures between 1600° C. and 1700° C. under vacuum (alternately argon can be employed). The sintered density was between 75 and 90% of the theoretical density.

EXAMPLE 3

100 parts by weight of uranium nitride powder with a surface area of 1.0 to 2.0 m.$^2$/g. were agglomerated to secondary particles having a diameter between 100 and 1000 μm. These agglomerates were homogenized in a mixer with a mixture of plutonium oxide and carbon having the same weights and particle size as in Example 2. This mixture of plutonium oxide and carbon was so set up that by reaction in a nitrogen atmosphere in a conventional fashion (e.g. at 700–1800° C.) plutonium nitride was formed. The fuel tablets were compressed at pressures between 1 and 5 metric tons/cm.$^2$ to green briquettes with densities between 50 and 80% of the theoretical density. The sintering took place for 4 hours at temperatures between 1600 and 1700° C. in a vacuum (an argon atmosphere can also be employed). The sintered density was between 75 and 85% of the theoretical density. After the sintering there were present beside relatively dense fissile regions (approximately 75% theoretical density), relatively porous fuel regions (approximately 95% theoretical density) which permitted ventilation of the fission gases.

EXAMPLE 4

100 parts by weight of uranium carbide granules with a surface area of 1.0 to 2.0 m.$^2$/g. were produced by grinding in a vibration ball mill the product of synthesis from uranium oxide and carbon. The grinding took place using a grinding liquid (specifically Decalin) with the addition of 0.2 to 1.0, e.g. 0.6% weight percent (based on the dry material to be ground) of stearic acid. After the grinding liquid was removed by vacuum distillation and the uranium carbide powder mixed with the stearic acid granulated over screens. The granulate having a particle diameter of 30 to 100 μm. was homogenized in a mixer with a mixture of 20 parts by weight of plutonium oxide and carbon (of which 14.5 weight percent was carbon). The fuel discs were compressed at pressures between 2 and 5 metric tons/cm.$^2$ to briquettes having between 50 and 80% of the theoretical density. The sintering of these briquettes was carried out for 3 hours at temperatures between 1600° C. and 1700° C. under a vacuum (an argon atmosphere can also be used). There were obtained sintered densities between 75 and 85% of the theorretical density. After the sintering the fertile and fuel regions existed substantially separated in which the relatively porous fuel regions permitted a ventilation of the fission gases.

EXAMPLE 5

100 parts by weight of uranium carbide granules with a surface area of 1.0 to 2.0 m.$^2$/g. were produced by grinding in a vibration ball mill the product of synthesis from uranium oxide and carbon. The grinding took place using the same grinding liquid as in Example 4 with the addition of 0.2 to 1.0 weight percent, e.g. 0.6% (based on the dry material to be ground) of stearic acid. After the grinding the grinding liquid was removed by vacuum distillation and the uranium carbide mixed with stearic acid was granulated over screens. The granulate was homogenized in a mixer with 20 parts by weight of the product obtained by prereacting a mixture of plutonium oxide and carbon (14.5 weight percent carbon) at 1300° C. to 1400° C. and subsequently grinding to a surface area of 0.6 to 1.2 m.$^2$/g. (about ⅗ the surface area of the uranium carbide on the average). The fuel tablets were compressed at pressures between 2 and 5 metric tons/cm.$^2$ to briquettes having between 50 and 80% of the theoretical density. These briquettes were sintered for 3 hours at temperatures between 1600° C. and 1700° C. in a vacuum (argon can also be used as the atmosphere). The density of the sintered product was between 85 and 95% of the theoretical density. After the sintering, the fertile and fuel regions existed substantially separated in which the regions were relatively porous and permitted a ventilation of the fission gases.

EXAMPLE 6

100 parts by weight of uranium nitride granules with a surface area of 1.0 to 2.0 m.$^2$/g. were produced by grinding in a vibration ball mill the product of synthesis from uranium oxide, carbon and nitrogen. The grinding took place using the same grinding liquid as in Example 4 with the addition of 0.2 to 1.0 weight percent e.g. 0.6% (based on the dry material to be ground) of stearic acid. After the grinding, the grinding liquid was removed by vacuum distillation and the uranium nitride powder mixed with stearic acid granulated over screens. The granulate was homogenized in a mixer with 15 parts by weight of the product obtained by prereacting a mixture of plutonium oxide and carbon (9.6 weight percent carbon) at 1300° C. to 1400° C., and subsequently grinding to a surface area of 0.6 to 1.2 m.$^2$/g. (about ⅗ the surface area of the uranium nitride on the average). The carbon content of this mixture was so adjusted that upon reaction in a nitrogen atmosphere, plutonium nitride was formed. The fuel tablets (after the formation of plutonium nitride by the nitriding reaction) were compressed at pressures between 2 and 5 metric tons/cm.$^2$ to briquettes having between 50 and 80% of the theoretical density. These briquettes were sintered for 3 hours at temperatures between 1600° C. and 1700° C. in a vacuum (argon can also be used). The density of the sintered product was between 75 and 90% of the theoretical density. After the sintering the fertile and fuel regions existed separately in which the fuel regions were relatively more porous than the fertile regions and permitted a ventilation of the fission gases.

EXAMPLE 7

100 parts of uranium carbide powder having a surface area of 1.0 to 2.0 m.$^2$/g. were agglomerated to secondary particles with diameters between 100 and 1000 μm. These agglomerates were homogenized in a mixer with 20 parts by weight of the prereacted mixture of plutonium oxide and carbon. The mixture of plutonium oxide and carbon was so regulated that there was formed an under stoichiometric plutonium carbide having a metal content of about 5 weight percent. The fuel tablets were compressed at pressures between 2 and 5 metric tons/cm.$^2$ to green briquettes having densities between 50 and 80% of the theoretical density. The sintering took place in a vacuum for 4 hours at temperatures between 1600° C. and 1700° C. Toward the end of the sintering the resulting metal portion, which preferably is enriched on the particle surfaces of the plutonium carbide, was nitrided in a nitrogen atmosphere for 3 hours at temperatures between 700° C. and 1800° C. (alternately it can be sulfided with $H_2S$ or phosphided with $H_3P$). The sintered densities obtained were between 75 and 95% of the theoretical density. The fuel and fertile regions present were substantially separated in which the fuel regions were relatively more porous than the fertile regions and permitted a ventilation of the fission gases.

EXAMPLE 8

100 parts of uranium carbide powder having a surface area of 1.0 to 2.0 m.$^2$/g. were agglomerated to secondary particles having diameters between 100 and 1000 μm. These agglomerates were homogenized in a mixer with 20 parts of a mixture of plutonium oxide and carbon. The mixture of plutonium oxide and carbon was so regulated that there was formed an under-stoichiometric plutonium carbide with a metal content of about 5 weight percent. The fuel tablets were compressed at pressures between 2 and 5 metric tons/cm.$^2$ to green briquettes having densities between 50 and 80% of the theoretical density. The sintering took place in a vacuum for 3 hours at temperatures between 1600° C. and 1700° C. Toward the end of the sintering the resulting metal portion, which preferably is enriched on the particle surfaces of the plutonium carbide, was nitrided in a nitrogen stream for 3 hours at temperatures between 700° C. and 1800° C. The sintered densities produced were between 75 and 90% of the theoretical density. After the sintering the fuel and fertile regions were present substantially separated in which the fuel region was relatively more porous than the fertile region and permitted a ventilation of the fission gases.

EXAMPLE 9

100 parts of uranium carbide having a surface area of 1.0 to 2.0 m.$^2$/g. were produced by grinding in a vibration ball mill the product of synthesis from uranium oxide and carbon. The grinding took place with a grinding liquid and the addition of 0.2 to 1.0% (based on the dry material being ground) of stearic acid. After the grinding the grinding liquid was removed by vacuum distillaton and the uranium carbide powder mixed with the stearic acid granulated over screens. These agglomerates with secondary particles whose diameters can be varied between 100 and 1000 μm., were added to 20 parts of a mixture of plutonium oxide and carbon in a mixer. The mixture of plutonium oxide and carbon was so regulated that there was found an under-stoichiometric plutonium carbide with a metal content of about 5 weight percent. The fuel tablets were compressed at pressures between 1 and 5 metric tons/cm.$^2$ to green briquettes having densities between 50 and 80% of the theoretical density. The sintering took place for 3 hours in a vacuum at temperatures between 1600° C. and 1700° C. Toward the end of the sintering the resulting metal portion, which preferably is enriched on the particle surfaces of the plutonium carbide, was nitrided in a nitrogen stream for 3 hours at temperatures between 700° C. and 1800° C. The sintered densities produced were between 75 and 90% of the theoretical density. After the sintering the fuel and fertile regions were present substantially separated in which the fuel region was relatively more porous than the fertile region and permited a ventilation of the fission.

EXAMPLE 10

100 parts of uranium carbide having a surface area of 1.0 to 2.0 m.$^2$/g. were produced by grinding in a vibration ball mill the product of synthesis from uranium oxide and carbon. The grinding took place with a grinding liquid and the addition of 0.2 to 1.0% (based on the dry material being ground) of stearic acid. After the grinding the liquid was removed by vacuum distillation and the uranium carbide mixed with the stearic acid granulated over screens. The secondary particles thus formed had diameters between 100 and 1000 μm. These agglomerates homogenized in a mixer with 20 parts of the product obtained by prereacting a mixture of plutonium oxide and carbon at 1300° C. to 1400° C. The mixture of plutonium oxide and carbon was so regulated that there was formed an under-stoichiometric plutonium carbide having a metal content of about 5 weight percent. The fuel tablets were compressed at pressures between 1 and 5 metric tons/cm.$^2$ to binder-free green briquettes having densities between 50 and 80% of the theoretical density. The sintering took place in a vacuum for 3 hours at temperatures between 1600° C. and 1700° C. Toward the end of the sintering the resulting metal portion, which preferably is enriched on the particle surfaces of the plutonium carbide, was nitrided in a nitrogen atmosphere for 3 hours at temperatures between 700 and 1800° C. The sintered densities obtained were between 80 and 95% of the theoretical density. The fuel and fertile regions present were substantially separated in which the fuel regions were relatively more porous than the fertile regions and permitted a ventilation of the fission gases.

What is claimed is:

1. Nuclear fuel tablets consisting essentially of a mixture, said mixture being a member of the group consisting of (a)(1) fertile uranium carbide particles and (2) fuel plutonium carbide particles and (b) fertile uranium carbide particles and fuel plutonium carbide particles wherein (a)(2) and (b) are encased in a layer of a member of the group consisting of plutonium nitride, plutonium sulfide and plutonium phosphide, in which the fertile material and the fuel material are present in separate regions in said tablets, the fuel material regions having a higher and more open porosity than the fertile material regions in the tablets.

2. Fuel tablets according to claim 1 wherein the plutonium carbide particles are encased in a layer of plutonium nitride.

3. Fuel tablets according to claim 2 wherein the plutonium nitride layer has a thickness of 2 to 20 μm.

4. Fuel tablets according to claim 1 wherein the porosity of the fuel is 1.2 to 2 times the porosity of the fertile material.

5. Fuel tablets according to claim 4 wherein the weight of the fuel material is 15 to 20% of the weight of the fertile material.

References Cited

UNITED STATES PATENTS

| | | | |
|---|---|---|---|
| 3,338,989 | 8/1967 | Russell et al. | 264—0.5 |
| 3,421,979 | 1/1969 | Linning | 176—68 |
| 3,669,832 | 6/1972 | Boettcher | 176—91 SP |
| 3,671,453 | 6/1972 | Triggiani et al. | 252—301.1 S |

CARL D. QUARFORTH, Primary Examiner

R. L. TATE, Assistant Examiner

U.S. Cl. X.R.

176—68, 89; 264—0.5

UNITED STATES PATENT OFFICE
CERTIFICATE OF CORRECTION

Patent No. 3,813,344　　　　　　　　　Dated May 28, 1974

Inventor(s) Krauth et al.

It is certified that error appears in the above-identified patent and that said Letters Patent are hereby corrected as shown below:

Claims priority, German Application P 20 49 573.2 filed October 9, 1970.

Signed and sealed this 7th day of January 1975.

(SEAL)
Attest:

McCOY M. GIBSON JR.
Attesting Officer

C. MARSHALL DANN
Commissioner of Patents